United States Patent
Ranga

(10) Patent No.: US 9,580,107 B1
(45) Date of Patent: Feb. 28, 2017

(54) MODULAR HYBRID CROSS CAR BEAM ASSEMBLY

(71) Applicant: Dura Operating, LLC, Auburn Hills, MI (US)

(72) Inventor: Suhant Prajwal Reddy Ranga, Northville, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/138,881

(22) Filed: Apr. 26, 2016

(51) Int. Cl.
*B62D 21/03* (2006.01)
*B62D 27/02* (2006.01)
*B62D 25/14* (2006.01)
*B62D 29/00* (2006.01)
*B62D 21/09* (2006.01)

(52) U.S. Cl.
CPC .............. *B62D 21/03* (2013.01); *B62D 21/09* (2013.01); *B62D 25/145* (2013.01); *B62D 27/023* (2013.01); *B62D 29/004* (2013.01)

(58) Field of Classification Search
CPC ...... B62D 21/03; B62D 21/09; B62D 25/145; B62D 27/023; B62D 29/004
USPC ........................................ 296/193.02, 70, 72
See application file for complete search history.

(56) References Cited

U.S. PATENT DOCUMENTS

| 7,216,927 | B2 * | 5/2007 | Luo ...................... B62D 25/145 296/193.02 |
| 8,474,902 | B2 | 7/2013 | Malek et al. |
| 2009/0252908 | A1 | 10/2009 | Angenheister et al. |
| 2015/0056428 | A1 | 2/2015 | Birka |

FOREIGN PATENT DOCUMENTS

| DE | 102010014533 A1 | 10/2011 |
| EP | 1842714 A1 | 10/2007 |

* cited by examiner

*Primary Examiner* — Joseph D Pape
(74) *Attorney, Agent, or Firm* — Robert Ford; Steven L. Crane; Vivacqua Law, PLLC

(57) ABSTRACT

A modular hybrid cross-car beam assembly includes a base tube having opposed first and second free ends. Multiple assemblies are individually connected to the base tube, each of the assemblies having multiple metal plates coupled together by an overmolding of a polymeric material and each of the assemblies having at least one metal flange lacking the overmolding of the polymeric material. First and second end attachment portions are each connected to one of the base tube first or second free ends. The metal flange of each of the assemblies and the first and second end attachment portions are connected to the base tube using fasteners, the modular hybrid cross-car beam assembly having no welded connections.

20 Claims, 4 Drawing Sheets

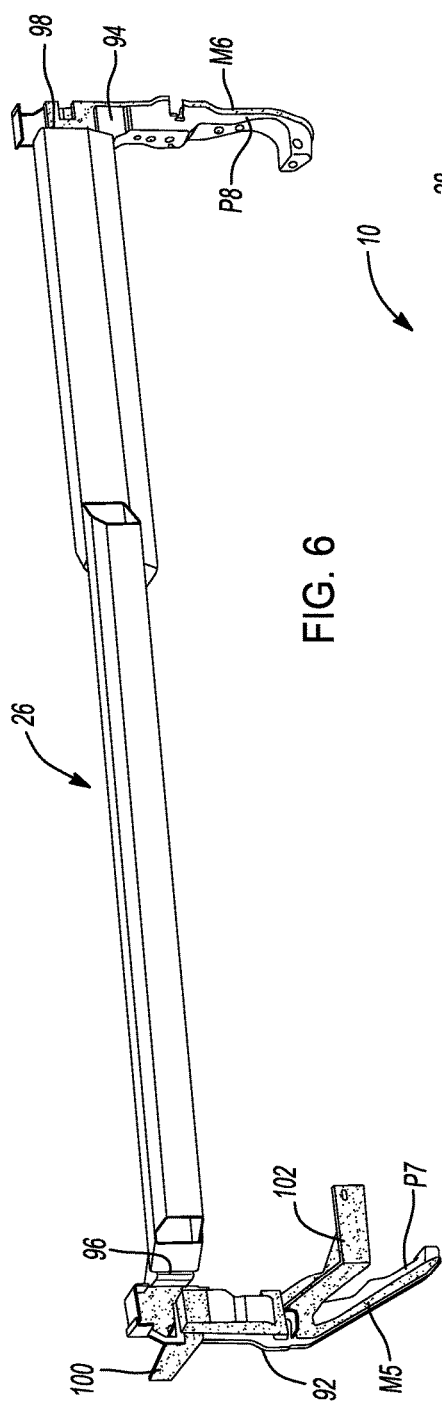
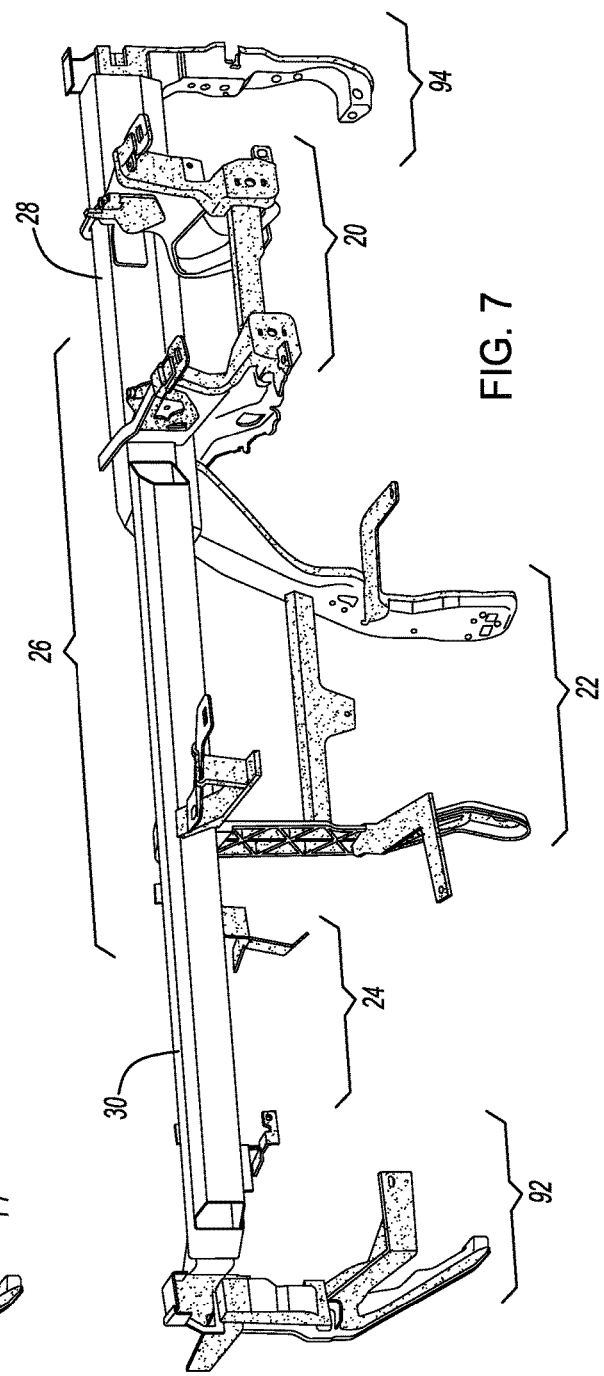

MODULAR HYBRID CROSS CAR BEAM ASSEMBLY

FIELD

The invention relates generally to a cross car beam of a motor vehicle.

BACKGROUND

The statements in this section merely provide background information related to the present disclosure and may or may not constitute prior art.

In common motor vehicle frame structures, cross car beams are used to connect between vehicle pillars, and to support multiple components such as steering assemblies, dashboard equipment, glove boxes, and the like. Current cross car beam designs include metal such as aluminum members selected for reduced weight, which are welded together to maximize strength. Welding of aluminum however, can result in Heat Affected Zones (HAZ's) which locally reduce the strength of the welded joint. In addition, the cost and time to prepare weld joints, which can number approximately 50 or more for a typical cross car beam, and to grind or clean the weld joints after welding to prepare for paint or a coating material can be high.

While material coatings such as a polymeric coating applied onto the aluminum structural members are known which are relied on to further reduce weight, known aluminum cross car beam assemblies having polymeric material coating applied to specific areas can be limited due to the size, complexity, cost, processes, and the like required for assembly. This field can therefore benefit from improved cross car beam designs.

SUMMARY

According to several aspects, a modular hybrid cross-car beam assembly includes at least one assembly having multiple individual metal parts connected together by an overmolding of a polymeric material. The at least one assembly further has at least one metal flange lacking the overmolding of the polymeric material. A metal base tube supports the at least one assembly. Multiple fasteners connect the at least one metal flange of the at least one assembly to the base tube, the modular hybrid cross-car beam assembly having no welded connections.

In one aspect, the beam assembly includes a first base tube free end and an opposed second base tube free end; and first and second end attachment portions are each connected to one of the opposed first or second base tube free ends.

In another aspect, the first and second end attachment portions each include attachment portion metal parts overmolded by the polymeric material.

In another aspect, the at least one metal flange includes multiple flanges each directly contacting an outer wall of the base tube, having at least one fastener of the multiple fasteners received through each of the multiple flanges and the base tube to couple the multiple flanges to the base tube.

In another aspect, the at least one fastener is a self-tapping flow-drill fastener.

In another aspect, the at least one fastener is a self-piercing rivet.

In another aspect, the at least one fastener is a riv-nut defining a screw and nut assembly.

In another aspect, the base tube includes first and second tubes fastened to each other.

In another aspect, the first tube has a longitudinal axis offset from a longitudinal axis of the second tube.

In another aspect, one of the multiple metal flanges of the at least one assembly defines a coupling connector directly contacting an overlapped portion of the first tube and the second tube.

In another aspect, the at least one assembly includes: a first assembly defining a steering column support portion; a second assembly defining a dashboard support portion; and a third assembly defining a glove box support portion.

According to further aspects, a glass fiber is added to the polymeric material in an amount ranging between approximately 30% to approximately 60% by weight for reinforcement.

According to further aspects, a modular hybrid cross-car beam assembly includes a base tube having opposed first and second free ends. Multiple assemblies are individually connected to the base tube, each of the assemblies having multiple metal plates coupled together by an overmolding of a polymeric material and each of the assemblies having at least one metal flange lacking the overmolding of the polymeric material. First and second end attachment portions are each connected to one of the base tube first or second free ends. The at least one metal flange of each of the assemblies and the first and second end attachment portions are connected to the base tube using fasteners, the modular hybrid cross-car beam assembly having no welded connections.

In another aspect, a first one of the assemblies defines a steering column support portion; a second one of the assemblies defines a dashboard support portion; and a third one of the assemblies defines a glove box support portion.

In another aspect, the base tube includes: a first tube and a second tube. The first tube has a tube longitudinal axis offset from a longitudinal axis of the second tube, providing an overlapping portion of the first tube and the second tube. A coupling connector contacts the overlapping portion, the coupling connector fastened to the first tube and the second tube.

In another aspect, any of the steering column support portion, the dashboard support portion, the glove box support portion, the first end attachment portion, and the second end attachment portion include at least one component made entirely of the polymeric material.

In another aspect, the first and the second end attachment portions are each adapted to be connected to a different structural pillar member of a motor vehicle.

In another aspect, the metal flange of each of the multiple assemblies is adapted to overlap a face of the base tube, the fasteners extending through the flange into the base tube.

In another aspect, each of the first attachment portion and the second end attachment portion include a metal plate overmolded with a polymeric material reinforced with a glass fiber.

According to further aspects, a modular hybrid cross-car beam assembly for a motor vehicle includes a base tube having opposed first and second free ends. First and second end attachment portions are each connected to one of the base tube first or second free ends. A first assembly defines a steering column support portion and a second assembly defines a dashboard support portion. Each of the first assembly and the second assembly include multiple metal plates coupled together by an overmolding of a polymeric material. At least one metal flange lacking the overmolding of the polymeric material extends outwardly from each of the first assembly and the second assembly. Each metal flange is connected to the base tube between the first and the second free ends using fasteners, and each of the first and second end attachment portions are connected to one of the first and the second free ends using fasteners, the modular hybrid cross-car beam assembly having no welded connections.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 6 is a front right perspective view of a base tube having end attachments portion of the modular hybrid cross-car beam assembly of FIG. 1;

FIG. 7 is a front right perspective view of the assembled modular hybrid cross-car beam assembly of FIG. 1;

DETAILED DESCRIPTION

The following description is merely exemplary in nature and is not intended to limit the present disclosure, application, or uses.

Figure 1:
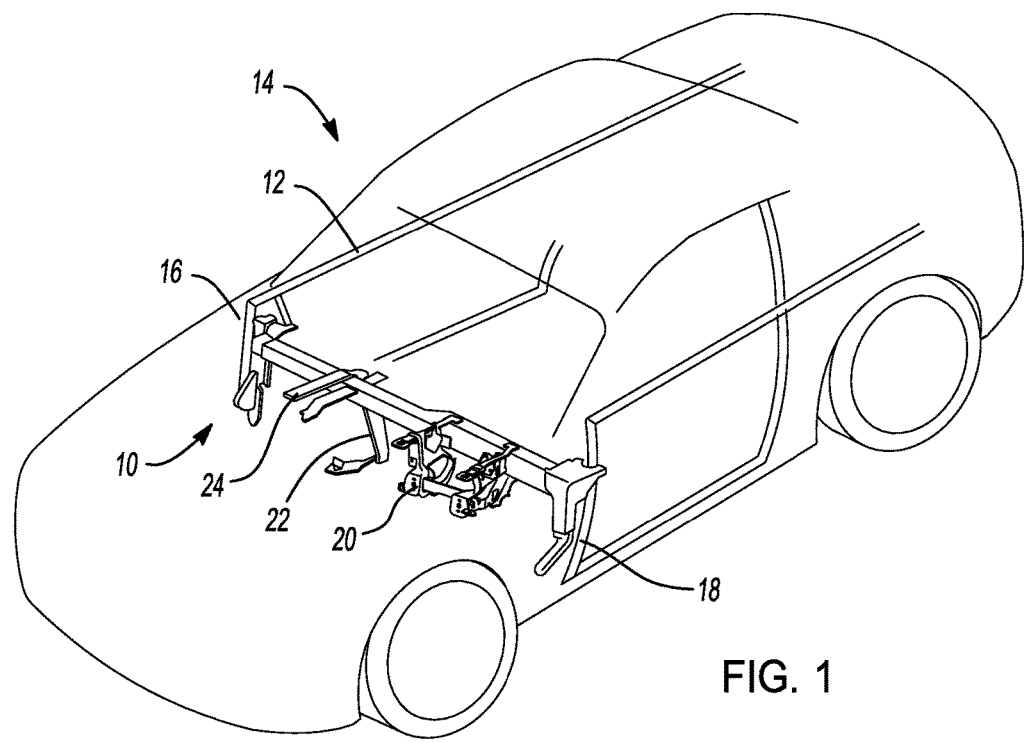
FIG. 1 is a partial cross sectional front left perspective view of a motor vehicle having a modular hybrid cross-car beam assembly of the present disclosure.

With reference to FIG. 1, a modular hybrid, cross-car beam assembly is generally indicated by reference number 10. According to several aspects, the beam assembly 10 is a structural member of an exemplary frame 12 used in a motor vehicle 14. The beam assembly 10 is connected at a first end to a first member 16 such as a first "A" frame or pillar member and at a second end to a second member 18 such as a second "A" frame or pillar member of the frame 12. The beam assembly 10 is itself used to support multiple component assemblies such as a steering assembly 20, a dashboard assembly 22, and a glove box assembly 24, and may also support other items (not shown) such as but not limited to wiring harnesses, tubing, ventilation components or ducting, and the like.

The beam assembly 10 is constructed without welded joints to eliminate the need for pre-weld joint preparation and post-weld grinding, and to eliminate heat distortion caused during weld operations due to the high welding temperatures. Elimination of weld joints also eliminates the formation of heat effected zones (HAZ) which may occur in the metal components of known beam assemblies. HAZ's are known to create local reductions in the material strength of the beam materials, particularly in welded aluminum materials.

Referring to FIG. 2 and again to FIG. 1, the beam assembly 10 includes a base tube 26, which is assembled from a first tube section 28 and a second tube section 30. To eliminate one or more bends in the base tube 26, a longitudinal central axis 32 of the first tube section 28 is offset from a longitudinal central axis 34 of the second tube section 30. A first face portion 36 of the first tube section 28 overlaps a second face portion 38 of the second tube section 30 providing an overlapping segment 40. The overlapping segment 40 of the first face portion 36 and second face portion 38 are connected using multiple fasteners 42. According to several aspects the fasteners 42 can be any one of flow drilled fasteners, self-piercing (SPR) rivets, or screw-bolt-nut Riv-Nuts. According to several aspects, the steering assembly 20, the dashboard assembly 22, and the glove box assembly 24 are individually separately assembled and are then attached to the base tube 26 using multiple fasteners such as the fasteners 42.

Figure 2:
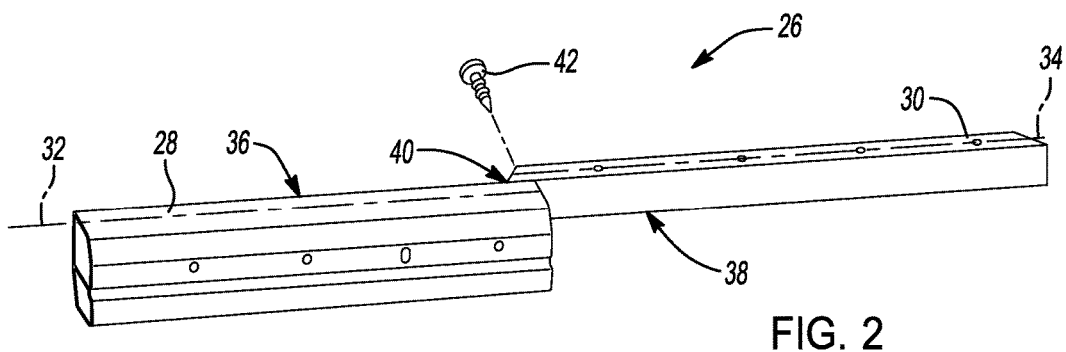
FIG. 2 is a top perspective view of a base tube of the modular hybrid cross-car beam assembly of FIG. 1.
Figure 3:
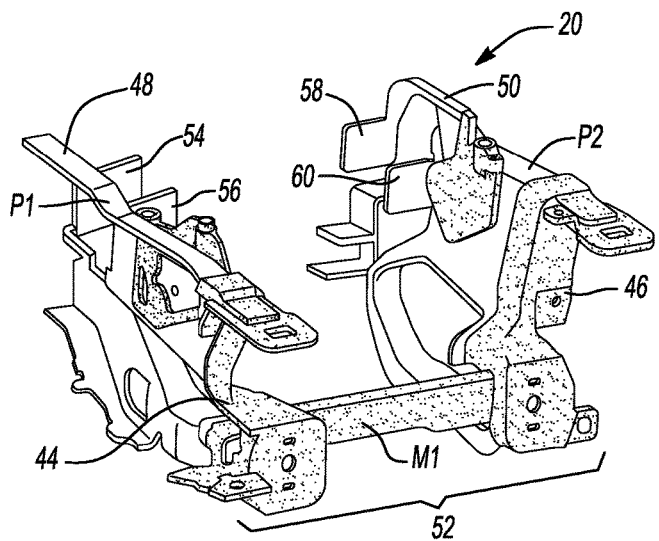
FIG. 3 is a front right perspective view of a steering assembly portion of the modular hybrid cross-car beam assembly of FIG. 1.

Referring to FIG. 3 and again to FIGS. 1 through 2, according to several aspects, the steering assembly 20 is constructed using multiple stampings, for example two front stampings 44, 46 and two rear stampings 48, 50 of a metal such as aluminum or steel. In order to reduce an overall weight of the beam assembly 10, at least two of the stampings such as the front stampings 44, 46 can be made from a reduced thickness metal plate P1, P2 and then together connected using an overmolding M1 of a polymeric material to create a single steering assembly component 52. The overmolding M1 can be added in a die such as in an injection molding machine, and the polymeric material used can include a glass fiber material such that the glass fiber is present in an amount ranging between approximately 30% to approximately 60% by weight for reinforcement strength. The overmolding M1 of polymeric material also offers the additional benefit of damping noise generated during vehicle operation from transferring through the steering assembly component 52.

With continuing reference to FIG. 3 and again to FIGS. 1 through 2, each of the stampings such as the two rear stampings 48, 50 include one or more flanges, such as a first flange 54, a second flange 56, a third flange 58, and a fourth flange 60 which lack the overmolding M1 of the polymeric material. Each pair of the flanges such as the first flange 54 and the second flange 56 are overlapped onto opposing ones of the outer faces of the base tube 26, which will be shown in greater detail in reference to FIG. 7. Fasteners such as the fasteners 42 previously discussed herein extend through the flanges and into the base tube 26, to connect the flanges, and therefore each of the two rear stampings 48, 50 and therefore the steering assembly 20 to the base tube 26. It is noted that the quantity of components for each of the assemblies can vary from the quantities identified herein without departing from the scope of the disclosure.

Figure 4:
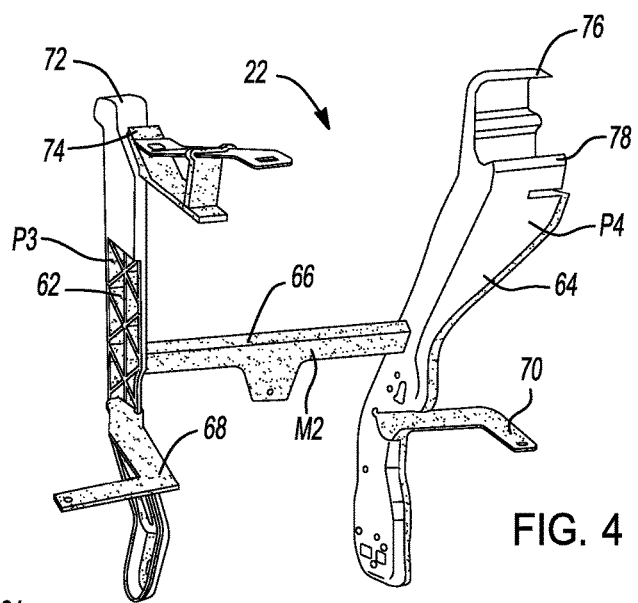
FIG. 4 is a front right perspective view of a dashboard assembly portion of the modular hybrid cross-car beam assembly of FIG. 1.

Referring now to FIG. 4 and again to FIGS. 1 through 2, according to several aspects the dashboard assembly 22 is made from five stampings, including first and second vertical stampings 62, 64, a horizontal stamping 66, and at least first and second attachment brackets 68, 70. Each of the first vertical stamping 80 and the second vertical stamping 82 can include a plate P3, P4 coupled together using an overmolding M2 of the polymeric material as described above with respect to the steering assembly 20. The horizontal stamping 66 and the first and second attachment brackets 68, 70 can be fastened, for example using SPR rivets, to the first and second vertical stampings 62, 64. Similar to the steering assembly 20, each of the stampings such as the first and second vertical stampings 62, 64 include one or more flanges, such as a first flange 72, a second flange 74, a third flange 76, and a fourth flange 78 which lack the overmolding M2 of the polymeric material. Individual pairs of the flanges such as a pair defined by the first flange 72 and the second flange 74 overlap and therefore directly contact the outer face or faces of the base tube 26, which will be shown in greater detail in reference to FIG. 7. Fasteners such as the fasteners 42 previously discussed herein extend through the flanges 72, 74, 76, 78 and into the base tube 26, to connect the flanges 72, 74, 76, 78, together with each of the first and second vertical stampings 62, 64 and therefore the dashboard assembly 22 to the base tube 26.

Figure 5:
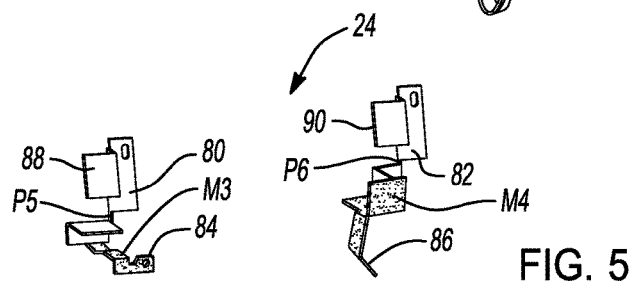
FIG. 5 is a front right perspective view of a glove box assembly portion of the modular hybrid cross-car beam assembly of FIG. 1.

Referring to FIG. 5, and again to FIGS. 1 through 2, the glove box assembly 24 is made from two stampings, including a first stamping 80 and a second stamping 82. Each of the first stamping 80 and the second stamping 82 include one or more plates generally indicated as P5, P6 with adjoining ones of the plates connected by an overmolding M3, M4 of the polymeric material as described above with respect to the steering assembly 20. The first stamping 80 can further include an attachment bracket 84, and the second stamping 82 can include an attachment bracket 86. Similar to the steering assembly 20, each of the stampings such as the first stamping 80 and the second stamping 82 include at least one flange, such as a first flange 88 and a second flange 90 which lack the overmolding M3, M4 of the polymeric material. Each of the flanges 88, 90 overlap and therefore directly contact an outer face or faces of the base tube 26, which will be shown in greater detail in reference to FIG. 7. Fasteners such as the fasteners 42 previously discussed herein extend through the flanges 88, 90 and into the base tube 26, to connect the flanges 88, 90, and therefore each of the first stamping 80 and the second stamping 82 and therefore the glove box assembly 24 to the base tube 26.

Referring to FIG. 6 and again to FIGS. 1 through 2, the beam assembly 10 further includes a first end attachment 92 and a second end attachment 94. The first end attachment 92 is fixed by fastening to a first free end 96 of the base tube 26, and the second end attachment 94 is fixed by fastening to an opposed second free end 98 of the base tube 26. Both of the first and the second end attachments 92, 94 include one or more plates P7, P8 with adjoining ones of the plates having an overmolding M5, M6 of the polymeric material to connect the plates as described above with respect to the steering assembly 20. Each of the first and the second end attachments 92, 94 can further include first and second attachment brackets, such as a first attachment bracket 100 and a second attachment bracket 102 which lack the overmolding M5, M6 of the polymeric material. Fasteners such as the fasteners 42 previously discussed herein extend through the first and the second attachment brackets 100, 102 and into the base tube 26, to connect the first and the second end attachments 92, 94 to the base tube 26.

Referring to FIG. 7 and again to FIGS. 1 through 6, the beam assembly 10 can be assembled by first connecting the first tube section 28 to the second tube section 30 to create the base tube 26. The steering assembly 20 can then be fastened onto the base tube 26, followed by the dashboard assembly 22 and the glove box assembly 24. The first and the second end attachments 92, 94 can then be individually fastened to one of the base tube first and second free ends 96, 98.

Figure 8:
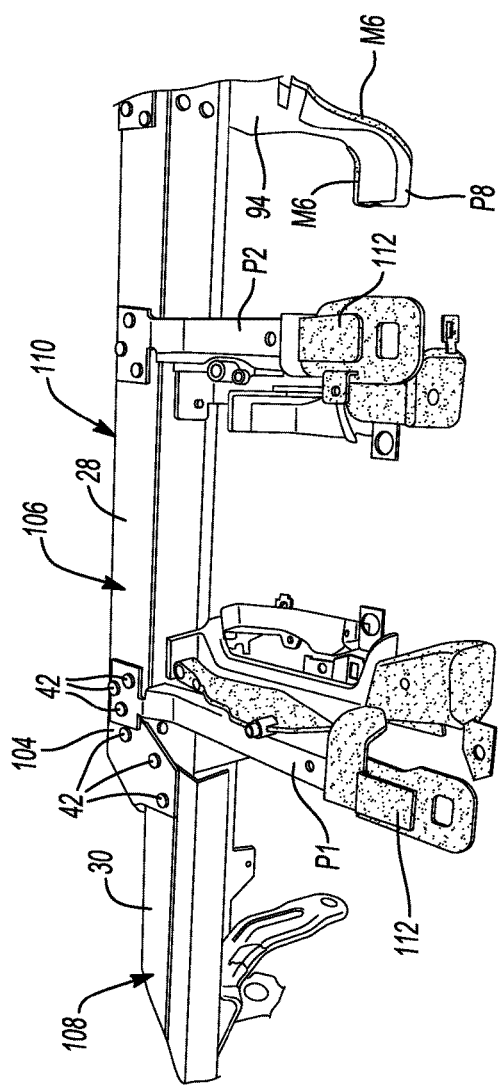
FIG. 8 is a top perspective view of a portion of the assembled modular hybrid cross-car beam assembly of FIG. 7.

Referring to FIGS. 8 and 9, again to FIGS. 1 through 7, the base tube 26 of the beam assembly 10 can further include a coupling connector 104 used to join the first tube section 28 to the second tube section 30. The coupling connector 104 directly contacts each of an upper face 106 of the first tube section 28 and an upper face 108 of the second tube section 30, and also directly contacts a rear face 110 of the first tube section 28. Multiple fasteners 42 extend through the coupling connector 104 and into the walls of the first and the second tube sections 28, 30. As evident in FIG. 8, the polymeric material 112 can be overmolded onto a portion of, or the entire surfaces defined by the plate P1 of the rear stamping 48. Similarly, the polymeric material 112 can also be overmolded onto a portion of or the entire surfaces of the previously described plates P2, P3, P4, P5, P6, P7, P8 and therefore used to couple adjoining ones of the multiple plates of the different assemblies.

Figure 9:
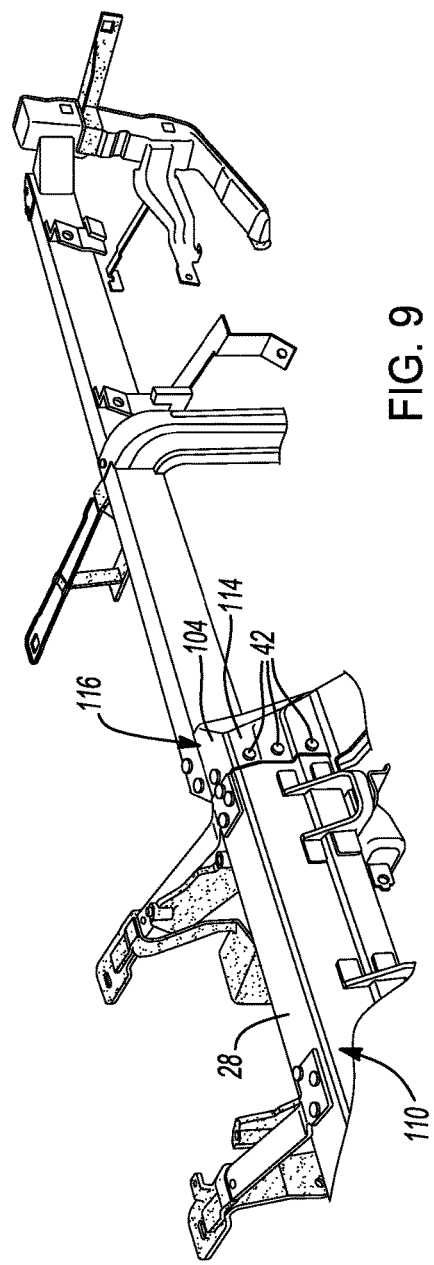
FIG. 9 is a left rear perspective view of a portion of the assembled modular hybrid cross-car beam assembly of FIG. 7.

With specific reference to FIG. 9, the coupling connector 104 includes an overlapping portion 114 that directly contacts the rear face 110 of the first tube section 28. This allows multiple fasteners 42 to engage the overlapping portion 114, as well as an upper face 116 of the coupling connector 104. The coupling connector 104 can be a metal and its geometry stiffens the joint between the first tube section 28 and the second tube section 30.

According to several aspects, a modular hybrid cross-car beam assembly 10 for a motor vehicle 12 includes a base tube 26 having opposed first and second free ends 96, 98. First and second end attachment portions 92, 94 are each connected to one of the base tube first or second free ends 96, 98. A first assembly 20 defines a steering column support portion and a second assembly 22 define a dashboard support portion. Each of the first assembly 20 and the second assembly 22 include multiple metal plates 44, 46, 62, 64 coupled together by an overmolding M1, M2 of a polymeric material. At least one metal flange 54, 56, 58, 60, 72, 74, 76, 78 lacking the overmolding M1, M2 of the polymeric material extend outwardly from each of the first assembly 20 and the second assembly 22. Each metal flange 54, 56, 58, 60, 72, 74, 76, 78 is connected to the base tube 26 between the first and the second free ends 96, 98 using fasteners 42. Each of the first and second end attachment portions 92, 94 are connected to one of the first and the second free ends 96, 98 using the fasteners 42, the modular hybrid cross-car beam assembly 10 having no welded connections.

It is noted that items identified herein as being a stamping of a metal material can also be provided as cast, forged, or extruded structures. The polymeric material described herein can be selected from multiple types of polymers, including but not limited to synthetic polymers, and aliphatic or semi-aromatic polyamide materials.

The description of the invention is merely exemplary in nature and variations that do not depart from the gist of the invention are intended to be within the scope of the invention. Such variations are not to be regarded as a departure from the spirit and scope of the invention.

The following is claimed:
1. A modular hybrid cross-car beam assembly, comprising:
   at least one assembly having multiple individual metal parts connected together by an overmolding of a polymeric material, the at least one assembly further having at least one metal flange lacking the overmolding of the polymeric material;
   a metal base tube supporting the at least one assembly; and multiple fasteners connecting the at least one metal flange of the at least one assembly to the base tube, the modular hybrid cross-car beam assembly having no welded connections.

2. The modular hybrid cross-car beam assembly of claim 1, further including:
   a first base tube free end and an opposed second base tube free end; and
   first and second end attachment portions each connected to one of the opposed first or second base tube free ends.

3. The modular hybrid cross-car beam assembly of claim 2, wherein the first and second end attachment portions each include attachment portion metal parts overmolded by the polymeric material.

4. The modular hybrid cross-car beam assembly of claim 1, wherein the at least one metal flange includes multiple flanges each directly contacting an outer wall of the base tube, having at least one fastener of the multiple fasteners received through each of the multiple flanges and the base tube to couple the multiple flanges to the base tube.

5. The modular hybrid cross-car beam assembly of claim 4, wherein the at least one fastener is a self-tapping flow-drill fastener.

6. The modular hybrid cross-car beam assembly of claim 4, wherein the at least one fastener is a self-piercing rivet.

7. The modular hybrid cross-car beam assembly of claim 4, wherein the at least one fastener is a riv-nut defining a screw and nut assembly.

8. The modular hybrid cross-car beam assembly of claim 1, wherein the base tube includes first and second tubes fastened to each other.

9. The modular hybrid cross-car beam assembly of claim 8, wherein the first tube has a longitudinal axis offset from a longitudinal axis of the second tube.

10. The modular hybrid cross-car beam assembly of claim 9, wherein one of the multiple metal flanges of the at least one assembly defines a coupling connector directly contacting an overlapped portion of the first tube and the second tube.

11. The modular hybrid cross-car beam assembly of claim 1, wherein the at least one assembly includes:
    a first assembly defining a steering column support portion;
    a second assembly defining a dashboard support portion; and
    a third assembly defining a glove box support portion.

12. The modular hybrid cross-car beam assembly of claim 1, further including a glass fiber added to the polymeric material in an amount ranging between approximately 30% to approximately 60% by weight for reinforcement.

13. A modular hybrid cross-car beam assembly, comprising:
    a base tube having opposed first and second free ends;
    multiple assemblies individually connected to the base tube, each of the assemblies having multiple metal plates coupled together by an overmolding of a polymeric material and each of the assemblies having at least one metal flange lacking the overmolding of the polymeric material; and
    first and second end attachment portions each connected to one of the base tube first or second free ends;
    wherein the at least one metal flange of each of the assemblies and the first and second end attachment portions are connected to the base tube using fasteners, the modular hybrid cross-car beam assembly having no welded connections.

14. The modular hybrid cross-car beam assembly of claim 13, wherein:
    a first one of the assemblies defines a steering column support portion;
    a second one of the assemblies defines a dashboard support portion; and
    a third one of the assemblies defines a glove box support portion.

15. The modular hybrid cross-car beam assembly of claim 14, wherein the base tube includes:
    a first tube and a second tube, the first tube having a tube longitudinal axis offset from a longitudinal axis of the second tube, providing an overlapping portion of the first tube and the second tube, and
    a coupling connector contacting the overlapping portion, the coupling connector fastened to the first tube and the second tube.

16. The modular hybrid cross-car beam assembly of claim 14, wherein any of the steering column support portion, the dashboard support portion, the glove box support portion, the first end attachment portion, and the second end attachment portion include at least one component made entirely of the polymeric material.

17. The modular hybrid cross-car beam assembly of claim 13, wherein the first and the second end attachment portions are each adapted to be connected to a different structural pillar member of a motor vehicle.

18. The modular hybrid cross-car beam assembly of claim 13, wherein the metal flange of each of the multiple assemblies is adapted to overlap a face of the base tube, the fasteners extending through the flange into the base tube.

19. The modular hybrid cross-car beam assembly of claim 13, wherein each of the first attachment portion and the second end attachment portion include a metal plate overmolded with a polymeric material reinforced with a glass fiber.

20. A modular hybrid cross-car beam assembly for a motor vehicle, comprising:
    a base tube having opposed first and second free ends;
    first and second end attachment portions each connected to one of the base tube first or second free ends;
    a first assembly defining a steering column support portion and a second assembly defining a dashboard support portion, each of the first assembly and the second assembly including multiple metal plates coupled together by an overmolding of a polymeric material; and
    at least one metal flange lacking the overmolding of the polymeric material extending outwardly from each of the first assembly and the second assembly;
    wherein each metal flange is connected to the base tube between the first and the second free ends using fasteners, and each of the first and second end attachment portions are connected to one of the first and the second free ends using fasteners, the modular hybrid cross-car beam assembly having no welded connections.

* * * * *